United States Patent
Hijiya et al.

(10) Patent No.: US 10,082,616 B2
(45) Date of Patent: Sep. 25, 2018

(54) GLASS PLATE, LIGHT GUIDE PLATE UNIT, PLANAR LIGHT-EMITTING DEVICE, AND LIQUID CRYSTAL DISPLAY DEVICE

(71) Applicant: Asahi Glass Company, Limited, Chiyoda-ku (JP)

(72) Inventors: Hiroyuki Hijiya, Chiyoda-ku (JP); Yusuke Arai, Chiyoda-ku (JP); Yutaka Kuroiwa, Chiyoda-ku (JP); Tetsuya Nakashima, Chiyoda-ku (JP); Yuki Kondo, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 23 days.

(21) Appl. No.: 15/139,586

(22) Filed: Apr. 27, 2016

(65) Prior Publication Data

US 2016/0238778 A1 Aug. 18, 2016

Related U.S. Application Data

(63) Continuation of application No. PCT/JP2014/079369, filed on Nov. 5, 2014.

(30) Foreign Application Priority Data

Nov. 8, 2013 (JP) ................................ 2013-232008

(51) Int. Cl.
*F21V 8/00* (2006.01)
*C03C 3/087* (2006.01)
(Continued)

(52) U.S. Cl.
CPC ............ *G02B 6/0065* (2013.01); *C03C 3/085* (2013.01); *C03C 3/087* (2013.01); *C03C 3/091* (2013.01);
(Continued)

(58) Field of Classification Search
None
See application file for complete search history.

(56) References Cited

U.S. PATENT DOCUMENTS

2002/0049128 A1* 4/2002 Koyama ................. C03C 3/062
501/69
2009/0278448 A1* 11/2009 Tchakarov ........ B32B 17/10155
313/504
(Continued)

FOREIGN PATENT DOCUMENTS

CN 103080030 A 5/2013
JP 2008-260642 10/2008
(Continued)

OTHER PUBLICATIONS

English Translation of International Search Report dated Dec. 16, 2014 in PCT/JP2014/079369, filed Nov. 5, 2014.
(Continued)

*Primary Examiner* — Anthony J Frost
(74) *Attorney, Agent, or Firm* — Oblon, McClelland, Maier & Neustadt, L.L.P.

(57) ABSTRACT

To provide a glass plate excellent in the internal transmittance of light rays in the visible region.
A glass plate consisting of multicomponent oxide glass, which has an effective optical path length of from 25 to 200 cm, a thickness of from 0.5 to 10 mm, and an average internal transmittance in the visible region of at least 80% and a chromaticity Y of tristimulus values in the XYZ colorimetric system as defined in JIS Z8701 (Appendix) of at least 90%, under the effective optical path length.

37 Claims, 1 Drawing Sheet

(51) Int. Cl.
    *C03C 3/091*    (2006.01)
    *C03C 4/00*     (2006.01)
    *C03C 3/085*    (2006.01)
    *C03C 3/095*    (2006.01)
    *G02F 1/13357*  (2006.01)

(52) U.S. Cl.
    CPC ............ *C03C 3/095* (2013.01); *C03C 4/0092* (2013.01); *G02B 6/0055* (2013.01); *B32B 2457/202* (2013.01); *G02F 1/1336* (2013.01)

(56) References Cited

U.S. PATENT DOCUMENTS

| | | | |
|---|---|---|---|
| 2011/0003483 A1 | 1/2011 | Nishizawa et al. | |
| 2014/0227525 A1 | 8/2014 | Matsuda et al. | |
| 2016/0238778 A1 † | 8/2016 | Yusuke | |

FOREIGN PATENT DOCUMENTS

| | | | | |
|---|---|---|---|---|
| JP | 2008-260642 A2 † | 10/2008 | | |
| JP | 2009-126781 | 6/2009 | | |
| JP | 2009-199875 A2 † | 9/2009 | | |
| JP | 2009-533808 T2 † | 9/2009 | | |
| JP | 2013-30279 | 2/2013 | | |
| JP | 2013-83995 | 5/2013 | | |
| JP | 2013-93195 | 5/2013 | | |
| JP | 2013-093195 A2 † | 5/2013 | | |
| JP | 2013089938 A * | 5/2013 | ............. | C03C 3/087 |
| JP | 2013093195 A * | 5/2013 | | |
| JP | WO 2013/162030 | 10/2013 | | |
| KR | 10-0983476 | 9/2010 | | |
| WO | WO 2009/131053 A1 | 10/2009 | | |
| WO | WO 2013/047676 A1 | 4/2013 | | |

OTHER PUBLICATIONS

Office Action issued Nov. 22, 2017, in Korean Patent Application No. 10-2017-7007374.

"Soda-lime glass", Jun. 4, 2017, Wikipedia, Web.†

* cited by examiner
† cited by third party

GLASS PLATE, LIGHT GUIDE PLATE UNIT, PLANAR LIGHT-EMITTING DEVICE, AND LIQUID CRYSTAL DISPLAY DEVICE

TECHNICAL FIELD

The present invention relates to a glass plate to be suitably used as a light guide plate of an edge-lit planar light-emitting device.

Further, the present invention relates to a light guide plate unit using the glass plate of the present invention, a planar light-emitting device using the light guide plate unit, and a liquid crystal display device using the planar light-emitting device.

BACKGROUND ART

Heretofore, a liquid crystal display device has been used for mobile phones, PDAs, liquid crystal televisions, etc. A liquid crystal display device basically comprises a planar light-emitting device as a backlight, and a liquid crystal unit disposed on the light-emitting surface side of the planar light-emitting device.

A planar light-emitting device may be a direct type or an edge-lit type. A direct type light-emitting device requires light sources of about the same size as the light-emitting surface since light sources are disposed on the rear side on the opposite side from the light-emitting surface. An edge-lit type light-emitting device employs light sources smaller than the light-emitting surface since light sources are disposed at the edges in a direction at right angles to the light-emitting surface, and thus the edge-lit type light-emitting device is suitable for an increase in the size of the screen of the liquid crystal display device.

Figure 1:
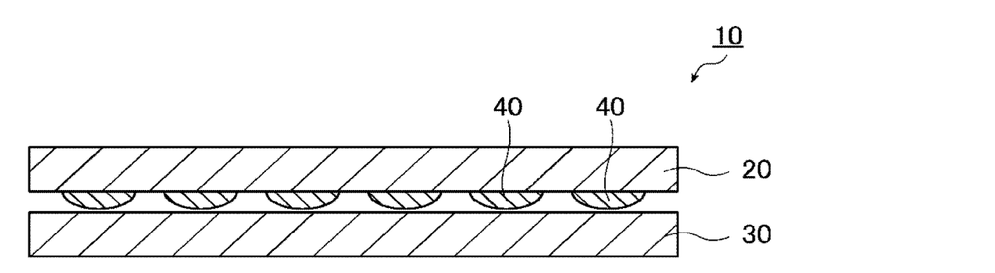
FIG. 1 is a cross-sectional view schematically illustrating an example of a constitution of a light guide plate unit.

One example of the constitution of a light guide plate unit to be used for an edge-lit type planar light-emitting device is shown in FIG. 1. A light guide plate unit 10 shown in FIG. 1 is constituted by a light guide plate 20 to transmit light from a light source (not shown) disposed on a side surface to the interior by total reflection and to emit the light flatly, and a reflecting plate 30 to return light emitted from a light-reflecting surface (lower surface in the drawing) on the opposite side of the light guide plate 20 from a light-emitting surface (upper surface in the drawing) which mainly emits light, to the light guide plate 20 again. On the light-reflecting surface of the light guide plate 20, a light-scattering part 40 in a dot pattern is provided. The light-scattering part 40 scatters light totally reflected in the interior and emits the light from the light-emitting surface, and suppresses non-uniformity of the brightness on the light-emitting surface in a case where the light source is a point light source, non-uniformity of the brightness on the light-emitting surface due to a difference in the distance from the light source, etc.

As the light guide plate 20 in the light guide plate unit 10, a plate made of a transparent resin material such as an acrylic resin or a polycarbonate resin has been used in view of a high transmittance, and a relatively low cost and availability.

In a case where the size of a planar light-emitting device is increased along with an increase in the size of the screen of a liquid crystal display device, a higher output light source is used, whereby the amount of heat generated from the light source increases, and a light guide plate is required to have heat resistance. The above light guide plate made of a resin material has a low glass transition point (Tg) of from 80 to 100° C. in the case of an acrylic resin or from 145 to 150° C. in the case of a polycarbonate resin, and thereby has insufficient heat resistance. Further, an acrylic resin is problematic in that it has absorption in the vicinity of the wavelength of 780 nm.

As a light guide plate more excellent in the heat resistance than the above light guide plate made of a resin material, a light guide plate made of a glass material has been proposed (Patent Documents 1 and 2). The glass transition point (Tg) can be increased to a level of 530° C. depending upon the composition of the glass material.

PRIOR ART DOCUMENTS

Patent Documents

Patent Document 1: JP-A-2013-93195
Patent Document 2: JP-A-2013-30279

DISCLOSURE OF INVENTION

Technical Problem

However, in a case where the dimensions of the light guide plate made of a glass material are increased along with an increase in the size of the screen of a liquid crystal display device, the optical path length of the light guide plate is longer, whereby the internal transmittance with respect to light rays in the visible region (from 380 to 780 nm) tends to be insufficient, and problems arise such that the brightness of the light guide plate decreases, there is non-uniformity of the brightness, and there is non-uniformity of the colors.

In this specification, the internal transmittance $T_{in}$ is a value represented by the following formula, where L (cm) is a certain optical path length, $l_0$(%) is the intensity of incident light, $l_1$(%) is the intensity of light after transmitted in the certain optical path length L (cm), and R (%) is the attenuation rate of light by reflection.

$$\log T_{in} = (\log(l_1/l_0) - \log R)$$

To overcome the above problems of conventional technique, the object of the present invention is to provide a glass plate excellent in the internal transmittance of light rays in the visible region, a light guide plate unit using the glass plate, a planar light-emitting device using the light guide plate unit, and a liquid crystal display device using the planar light-emitting device.

Solution to Problem

To achieve the above object, the glass plate according to one embodiment of the present invention is a glass plate consisting of multicomponent oxide glass, which has an effective optical path length of from 25 to 200 cm, a thickness of from 0.5 to 10 mm, and an average internal transmittance in the visible region of at least 80% and a chromaticity Y of tristimulus values in the XYZ colorimetric system as defined in JIS Z8701 (Appendix) of at least 90%, under the effective optical path length.

The glass plate of the present invention preferably satisfies the relation of 125 (cm·ppm)≤L×A≤10,000 (cm·ppm), where L (cm) is the effective optical path length of the glass plate, and A (mass ppm) is the content of total iron as calculated as $Fe_2O_3$ of the glass plate.

In this specification, the contents of components of the glass are represented by mass percentage (mass %) or by mass ppm, which may sometimes be represented simply as % or ppm, unless otherwise specified.

The glass plate of the present invention preferably satisfies the relation of 2.5 (cm·ppm)≤L×B≤3,000 (cm·ppm), where L (cm) is the effective optical path length of the glass plate, and B (ppm) is the content of $Fe^{2+}$ as calculated as $Fe_2O_3$ in total iron as calculated as $Fe_2O_3$ of the glass plate.

It is preferred that if the glass plate of the present invention contains at least one component selected from the group consisting of $MnO_2$, $TiO_2$, NiO, CoO, $V_2O_5$, CuO and $Cr_2O_3$, the total content of such components is at most 0.1% (at most 1,000 ppm) as represented by mass percentage based on oxides.

It is preferred that if the glass plate of the present invention contains at least one component selected from the group consisting of $CeO_2$, $Sb_2O_3$, $SnO_2$ and $As_2O_3$, the total content of such components is at most 0.3% (at most 3,000 ppm) as represented by mass percentage based on oxides.

It is preferred that the composition of the glass plate except for iron substantially comprises, as represented by mass percentage based on oxides, from 60 to 80% of $SiO_2$, from 0 to 7% of $Al_2O_3$, from 0 to 10% of MgO, from 4 to 20% of CaO, from 7 to 20% of $Na_2O$ and from 0 to 10% of $K_2O$.

It is preferred that the composition of the glass plate except for iron substantially comprises, as represented by mass percentage based on oxides, from 45 to 80% of $SiO_2$, more than 7% and at most 30% of $Al_2O_3$, from 0 to 15% of $B_2O_3$, from 0 to 15% of MgO, from 0 to 6% of CaO, from 7 to 20% of $Na_2O$, from 0 to 10% of $K_2O$ and from 0 to 10% of $ZrO_2$.

It is preferred that the composition of the glass plate except for iron substantially comprises, as represented by mass percentage based on oxides, from 45 to 70% of $SiO_2$, from 10 to 30% of $Al_2O_3$, from 0 to 15% of $B_2O_3$, from 5 to 30% in total of at least one component selected from the group consisting of MgO, CaO, SrO and BaO, and at least 0% and less than 7% in total of at least one component selected from the group consisting of $Li_2O$, $Na_2O$ and $K_2O$.

The glass plate of the present invention preferably has a glass composition having a content of total iron as calculated as $Fe_2O_3$ of from 5 to 150 ppm.

The glass plate of the present invention preferably has a glass composition having a content of $Fe^{2+}$ as calculated as $Fe_2O_3$ in total iron as calculated as $Fe_2O_3$ of from 0.02 to 30 ppm.

The present invention further provides a light guide plate unit, comprising a light guide plate, a dot pattern as a light scattering part provided on a light-reflecting surface on the opposite side of the light guide plate from a light-emitting surface, and a reflecting plate arranged on the light-reflecting surface side of the light guide plate, wherein as the light guide plate, the glass plate of the present invention is used.

The present invention further provides a planar light-emitting device, comprising the light guide plate unit of the present invention, and a light source disposed on the side surface of the light guide plate in the light guide plate unit.

The present invention further provides a liquid crystal display device, comprising the planar light-emitting device of the present invention, and a liquid crystal unit disposed on the light-emitting surface side of the planar light-emitting device.

In this specification, "to" used to show the range of the numerical values is used to include the numerical values before and after it as the lower limit value and the upper limit value, and unless otherwise specified, the same applies hereinafter.

Advantageous Effects of Invention

The glass plate of the present invention has an average internal transmittance in the visible region of at least 80% and a chromaticity Y of at least 90%, and accordingly it is suitable as a light guide plate to cope with an increase in the size of the screen of a liquid crystal display device.

The glass plate of the present invention, which is made of glass, has favorable heat resistance when used as a light guide plate.

DESCRIPTION OF EMBODIMENTS

Now, the glass plate of the present invention will be described with reference to the drawing.

The glass plate of the present invention is used as a light guide plate 20 of a light guide plate unit 10 as shown in FIG. 1. The glass plate of the present invention has an effective optical path length of from 25 to 200 cm so as to cope with an increase in the size of the screen of a liquid crystal display device. Here, the effective optical path length means a distance from an edge surface from which light enters the light guide plate to an edge surface on the opposite side, when the glass plate is used as the light guide plate, and in the case of the light guide plate 20 shown in FIG. 1, it corresponds to a length in a horizontal direction.

When the glass plate has an effective optical path length of at least 25 cm, it can be used for a light guide plate unit of a 20 inches or larger liquid crystal display device.

As the effective optical path length increases, the average internal transmittance and the chromaticity Y (hereinafter they may sometimes be generally referred as the internal transmittance) decreases. If the effective optical path length is longer than 200 cm, the required internal transmittance can hardly be achieved even when the after-mentioned total iron content of the glass plate and amount of $Fe^{2+}$ are restricted.

The glass plate of the present invention preferably has an effective optical path length of from 30 to 150 cm, more preferably from 35 to 120 cm.

The glass plate of the present invention is planar, and has a thickness of from 0.5 to 10 mm. The thickness of the glass plate corresponds to the length in the vertical direction in the case of the light guide plate 20 shown in FIG. 1.

The internal transmittance of the glass plate is influenced also by the thickness of the glass plate. If the glass plate has a thickness smaller than 0.5 mm, when it is used as a light guide plate, the number of reflection on the glass surface increases, attenuation by reflection increases, and thus the internal transmittance under the effective optical path length decreases. Accordingly, the required internal transmittance is hardly achieved even when the after-mentioned total iron content of the glass plate and amount of $Fe^{2+}$ are restricted. The thickness is preferably at least 1 mm, more preferably at least 1.5 mm.

On the other hand, if the glass plate has a thickness larger than 10 mm, when it is used as a light guide plate, the number of scattering of transmitted light by the light scattering part (40 in FIG. 1) on the lower side of the light guide plate decreases, and the amount of light taken to the outside decreases, and thus the internal transmittance under the effective optical path length decreases. Accordingly, the required internal transmittance is hardly achieved even when the after-mentioned total iron content of the glass plate and amount of $Fe^{2+}$ are restricted. The thickness is preferably at most 5 mm, more preferably at most 2.5 mm.

The glass plate of the present invention has a high internal transmittance $T_{in}$ in the visible region and has an average internal transmittance in said wavelength region of at least 80% under the effective optical path length.

Even when the glass plate has a high average internal transmittance in the visible region, if the light ray absorption in a specific wavelength region in the visible region is significant, problems may arise such that the brightness of the light guide plate decreases, there is non-uniformity of the brightness, or there is non-uniformity of the colors.

Accordingly, the glass plate of the present invention has an average internal transmittance in the visible region of at least 80% under the effective optical path length and in addition, has a chromaticity Y of tristimulus values in the XYZ colorimetric system as defined in JIS Z8701 (Appendix) (hereinafter, in this specification, referred to as "chromaticity Y") of at least 90% under the effective optical path length.

The chromaticity Y is determined by the following formula:

$$Y = \Sigma(S(\lambda) \times y(\lambda))$$

Here, $S(\lambda)$ is the transmittance at each wavelength, and $y(\lambda)$ is the weighting coefficient at the wavelength. Accordingly, $\Sigma(S(\lambda) \times y(\lambda))$ is the sum of products of the weighting coefficient and the transmittance at each wavelength.

Here, $y(\lambda)$ corresponds to cone cells M (cone cells G; green) among retinal cells of the eye, which respond the most to light at a wavelength of 535 nm.

The glass plate of the present invention has an average internal transmittance in the visible region of at least 80% under the effective optical path length and has a chromaticity Y of at least 90% under the effective optical path length, and accordingly it can be a light guide plate to cope with an increase in the size of the screen of a liquid crystal display device.

The glass plate of the present invention has an average internal transmittance in the visible region under the effective optical path length of preferably at least 82%, more preferably a least 85%, further preferably at least 90%.

The glass plate of the present invention has a chromaticity Y under the effective optical path length of preferably at least 91%, more preferably at least 92%, further preferably at least 93%.

The glass plate of the present invention consists of multicomponent oxide glass, which is widely selected from ones which satisfy the above average internal transmittance in the visible region and chromaticity Y under the effective optical path length.

In production of multicomponent oxide glass, iron is blended in the glass material so as to improve melting properties of the glass. However, iron has absorption in the visible region and accordingly, if the iron content is high, the internal transmittance in the visible region decreases.

The glass plate of the present invention has a total iron content which satisfies the after-mentioned conditions, and accordingly its absorption of light from 380 nm to 500 nm and from 600 nm to 780 nm is suppressed, and it may effectively be used even when the effective optical path length varies depending upon the size of the display, as in the case of an edge-lit type.

Specifically, the relation of 125 (cm·ppm)≤L×A≤10000 (cm·ppm) is preferably satisfied, where L (cm) is the effective optical path length of the glass plate, and A (ppm) is the content of total iron as calculated as $Fe_2O_3$ (hereinafter sometimes referred to as total iron content) of the glass plate.

The above relational formula of L and A was experimentally lead by the present inventors.

If L×A<125 (cm·ppm), the total iron content in the glass plate to be used for a planar light-emitting device of a size such that the effective optical path length of the light guide plate is from 25 to 200 cm, assumed in the present invention, is from 1 to 2 ppm, and mass production at a low cost tends to be difficult.

If L×A>10000 (cm·ppm), the total iron content in the glass plate tends to be high, and accordingly absorption of light in a wavelength region from 380 nm to 500 nm and in a wavelength region from 600 nm to 780 nm tends to be significant, the internal transmittance in the visible region decreases, and the above-described average internal transmittance in the visible region and chromaticity Y under the effective optical path length may not be satisfied.

Further, the glass plate of the present invention more preferably satisfies the relation of 250 (cm·ppm)≤L×A≤9000 (cm·ppm), further preferably satisfies the relation of 500 (cm·ppm)≤L×A≤8000 (cm·ppm).

The total iron content A of the glass plate of the present invention is preferably at most 150 ppm with a view to satisfying the above-described average internal transmittance in the visible region and chromaticity Y under the effective optical path length, and is more preferably at most 80 ppm, further preferably at most 50 ppm.

Whereas, the total iron content A of the glass plate of the present invention is preferably at least 5 ppm, with a view to improving the melting properties of the glass in production of the multicomponent oxide glass, and is more preferably at least 10 ppm, further preferably at least 20 ppm.

Here, the total iron content A of the glass plate may be adjusted by the amount of iron added in production of the glass.

In this specification, the total iron content of the glass plate is represented as the amount of $Fe_2O_3$, however, not all the iron present in the glass is present as $Fe^{3+}$ (trivalent iron). Usually, in glass, $Fe^{3+}$ and $Fe^{2+}$ (bivalent iron) are simultaneously present. $Fe^{2+}$ and $Fe^{3+}$ have absorption in the visible region, however, the absorption coefficient (11 $cm^{-1}$ $Mol^{-1}$) of $Fe^{2+}$ is an order of magnitude greater than the absorption coefficient (0.96 $cm^{-1}$ $Mol^{-1}$) of $Fe^{3+}$, and accordingly $Fe^{2+}$ significantly decreases the internal transmittance in the visible region. Accordingly, a low content of $Fe^{2+}$ is preferred with a view to increasing the internal transmittance in the visible region.

The glass plate of the present invention, in which the amount of $Fe^{2+}$ satisfies the after-mentioned conditions, has suppressed absorption of light in a wavelength region from 600 nm to 780 nm, and can be used effectively even when the effective optical path length changes depending upon the size of a display as in the case of an edge-lit type.

The glass plate of the present invention preferably satisfies the relation of 2.5 (cm·ppm)≤L×B≤3000 (cm·ppm), where L (cm) is the effective optical path length of the glass plate, and B (ppm) is the content of $Fe^{2+}$ as calculated as $Fe_2O_3$ in total iron as calculated as $Fe_2O_3$ of the glass plate. The above relational formula of L and B was experimentally lead by the present inventors.

If L×B<2.5 (cm·ppm), the content of $Fe^{2+}$ in the glass plate to be used for a planar light-emitting device of a size such that the effective optical path length of the light guide plate is from 25 to 200 cm, assumed in the present invention, is from 0.02 to 0.1 ppm, and mass production at a low cost tends to be difficult.

If L×B>3000 (cm·ppm), the content of $Fe^{2+}$ in the glass plate tends to be high, and accordingly absorption of light in a wavelength region from 600 nm to 780 nm tends to be significant, the internal transmittance in the visible region decreases, and the above-described average internal transmittance in the visible region and chromaticity Y under the effective optical path length may not be satisfied.

Further, the glass plate of the present invention more preferably satisfies the relation of 10 (cm·ppm)≤L×B≤2400 (cm·ppm), further preferably satisfies the relation of 25 (cm·ppm)≤L×B≤1850 (cm·ppm).

The content B of $Fe^{2+}$ of the glass plate of the present invention is preferably at most 30 ppm, with a view to satisfying the above-described average internal transmittance in the visible region and chromaticity Y under the effective optical path length, and is more preferably at most 20 ppm, further preferably at most 10 ppm.

Whereas, the content B of $Fe^{2+}$ of the glass plate of the present invention is preferably at least 0.02 ppm, with a view to improving the melting properties of glass in production of the multicomponent oxide glass, and is more preferably at least 0.05 ppm, further preferably at least 0.1 ppm.

Here, the content of $Fe^{2+}$ of the glass plate may be adjusted by the amount of an oxidizing agent added in production of glass. Specific oxidizing agents added in production of glass and their addition amount will be described hereinafter.

The amount A of $Fe_2O_3$ is the content (mass ppm) of total iron as calculated as $Fe_2O_3$ as obtained by fluorescent X-ray measurement. The content B of $Fe^{2+}$ was measured in accordance with ASTM C169-92. Further, the content of $Fe^{2+}$ measured is represented as calculated as $Fe_2O_3$.

The multicomponent oxide glass to be used for the glass plate of the present invention preferably has a low content of components having absorption in the visible region or contains no such components, with a view to satisfying the above-described average internal transmittance in the visible region and chromaticity Y under the effective optical path length.

Such components having absorption in the visible region may, for example, be $MnO_2$, $TiO_2$, NiO, CoO, $V_2O_5$, CuO and $Cr_2O_3$.

If the glass plate of the present invention contains at least one component selected from the group consisting of $MnO_2$, $TiO_2$, NiO, CoO, $V_2O_5$, CuO and $Cr_2O_3$, the total content of such components is preferably at most 0.1% (at most 1,000 ppm) as represented by mass percentage based on oxides, with a view to satisfying the above-described average internal transmittance in the visible region and chromaticity Y under the effective optical path length. The total content is more preferably at most 0.08% (at most 800 ppm), further preferably at most 0.05% (at most 500 ppm).

Further, in addition to the above components, components having absorption in the visible region may, for example, be $CeO_2$, $Sb_2O_3$, $SnO_2$ and $As_2O_3$.

If the glass plate of the present invention contains at least one component selected from the group consisting of $CeO_2$, $Sb_2O_3$, $SnO_2$ and $As_2O_3$, the total content of such components is preferably at most 0.3% (at most 3,000 ppm) as represented by mass percentage based on oxides, with a view to satisfying the above-described average internal transmittance in the visible region and chromaticity Y under the effective optical path length. The total content is more preferably at most 0.25% (at most 2,500 ppm), further preferably at most 0.2% (at most 2,000 ppm). In a case where only $Sb_2O_3$ is contained among the above components, a content of at most 0.5% (at most 5,000 ppm) as represented by mass percentage based on oxides is accepted.

However, since $CeO_2$, $Sb_2O_3$, $SnO_2$ and $As_2O_3$ function as an oxidizing agent of glass, they may be added for the purpose of adjusting the amount of $Fe^{2+}$ in the glass plate. However, $As_2O_3$ is not positively contained. If they are added as an oxidizing agent of glass, their addition amounts are preferably as follows as represented by mass percentage based on oxides.

In a case where $CeO_2$ is contained, its content is preferably at least 0.05% (at least 500 ppm), more preferably at least 0.07% (at least 700 ppm), further preferably at least 0.1% (at least 1,000 ppm).

In a case where $Sb_2O_3$ is contained, its content is preferably at least 0.1% (at least 1,000 ppm), more preferably at least 0.15% (at least 1,500 ppm), further preferably at least 0.2% (at least 2,000 ppm).

In a case where $SnO_2$ is contained, it content is preferably at least 0.05% (at least 500 ppm), more preferably at least 0.1% (at least 1,000 ppm), further preferably at least 0.15% (at least 1,500 ppm).

In a case where inclusion of $As_2O_3$ is inevitable, its content is preferably at most 0.14% (at most 1,400 ppm), more preferably at most 0.1% (at most 1,000 ppm), further preferably at most 0.07% (at most 700 ppm). Since As has toxicity even in the form of a compound, it is not usually used.

Specific examples of the glass composition of the glass plate of the present invention are shown below. However, the glass composition of the glass plate of the present invention is not limited thereto.

As one example of the constitution (constitution example A) of the glass plate of the present invention, the composition except for iron substantially comprises, as represented by mass percentage based on oxides, from 60 to 80% of $SiO_2$, from 0 to 7% of $Al_2O_3$, from 0 to 10% of MgO, from 4 to 20% of CaO, from 7 to 20% of $Na_2O$ and from 0 to 10% of $K_2O$.

As another example of the constitution (constitution example B) of the glass plate of the present invention, the composition except for iron substantially comprises, as represented by mass percentage based on oxides, from 45 to 80% of $SiO_2$, more than 7% and at most 30% of $Al_2O_3$, from 0 to 15% of $B_2O_3$, from 0 to 15% of MgO, from 0 to 6% of CaO, from 7 to 20% of $Na_2O$, from 0 to 10% of $K_2O$ and from 0 to 10% of $ZrO_2$.

As still another example of the constitution (constitution example C) of the glass plate of the present invention, the composition except for iron substantially comprises, as represented by mass percentage based on oxides, from 45 to 70% of $SiO_2$, from 10 to 30% of $Al_2O_3$, from 0 to 15% of $B_2O_3$, from 5 to 30% in total of at least one component selected from the group consisting of MgO, CaO, SrO and BaO, and at least 0% and less than 7% in total of at least one component selected from the group consisting of $Li_2O$, $Na_2O$ and $K_2O$.

The light guide plate unit of the present invention comprises, as the light guide plate unit 10 shown in FIG. 1, a light guide plate 20, a dot pattern 40 as a light scattering part provided on a light-reflecting surface on the opposite side of the light guide plate 20 from a light-emitting surface, and a reflecting plate 30 arranged on the light-reflecting surface side of the light guide plate 20. As the light guide plate 20, the above-described glass plate of the present invention is used.

As the reflecting plate 30, for example, a material obtained by mixing polypropylene, polyethylene terephthalate or the like with barium sulfate, titanium dioxide or the like may be preferably used. Further, as the reflecting plate 30, a resin material having fine bubbles formed therein, a metal plate having silver vapor-deposited thereon, or a metal plate coated with a coating composition containing barium sulfate, titanium dioxide or the like may, for example, be used. As the reflecting plate 30, a plurality of such materials may be overlaid to improve the reflectance. By improving the reflectance of the reflecting plate 30, the brightness on the light-emitting surface may be increased. Usually, the reflecting plate 30 is preferably one having a reflectance of at least 90%.

The dot pattern 40 is composed of a plurality of dots, and is provided to disturb the transmittance direction of light transmitted in the interior of the light guide plate 20 and to lead the light to the light-emitting surface. The dot pattern 40 may be formed by applying a coating composition which reflects light diffusely to the surface on the light-reflecting surface side of the light guide plate 20 by screen printing. The dot pattern 40 may be formed on the opposing surface of the reflecting plate arranged to face the light guide plate 20, however, in order to securely reflect light diffusely, it is preferably formed on the light guide plate 20.

By forming the dot pattern 40, an air layer (not shown) may be formed between adjacent dots, and air having a low refractive index may be brought into contact with the light-reflecting surface of the light guide plate 20, particularly with the light-reflecting surface exposed between adjacent dots, whereby the total reflection conditions are satisfied, light can sufficiently be transmitted to the interior of the light guide plate 20, and e.g. non-uniformity of the brightness on the light-emitting surface can be suppressed.

The shape of the dots may, for example, be circular, elliptic, rectangular, triangular or polygonal, but is not particularly limited so long as the dots can disturb the transmittance direction of light transmitted in the interior of the light guide plate 20 to lead the light to the light-emitting surface. The shape, the size, etc. of the dots may be changed according to the location of the light-reflecting surface as the case requires.

Usually, the dot pattern 40 is preferably such that the dots are formed at a higher density at a position farther from the light source, in order that the brightness on the light-emitting surface will be uniform. For example, in a case of a light guide plate 20 having a light source disposed on each of a pair of facing side surfaces, the dot pattern 40 is formed so that the density of the dots is low on the side surface sides at which the light source is disposed, and the density of the dots is high at a center portion. The density may be controlled, for example, by adjusting the sizes of the respective dots, or by adjusting the distance between adjacent dots while the sizes of the respective dots are the same.

The planar light-emitting device of the present invention comprises a light guide plate unit, and a light source disposed on a side surface of the light guide plate in the light guide plate unit. As the light guide plate unit, the light guide plate unit of the present invention is employed. The light source is composed of a light source main body and a light source substrate on which the light source main body is mounted.

Further, the light source may be provided on each of a pair of opposing side surfaces of the light guide plate 20 or may be provided only on one side surface.

As the light source may body, a line light source such as a cold cathode fluorescent lamp or a point light source such as a light-emitting diode (hereinafter referred to as LED), may be used. As the point light source, in addition to the LED, a laser diode may, for example, be used. As the LED, for example, a white LED comprising a semiconductor light-emitting element which emits monochromatic light such as blue light and a phosphor which absorbs part of the blue light emitted from the semiconductor light-emitting element to produce yellow light, may be employed. Further, as an LED, for example, one comprising elements each emitting red, green or blue light, and producing white light by mixing three monochromatic lights, may be employed.

As the light source substrate, for example, one on which a plurality of point light sources such as LEDs are mounted at certain intervals. On the light source substrate, a circuit pattern on which point light sources or the like are mounted and which supplies electricity to the point light sources or the like is formed.

The liquid crystal display device of the present invention comprises a planar light-emitting device, and a liquid crystal unit disposed on the light-emitting surface side of the planar light-emitting device. As the planar light-emitting device, the above-described planar light-emitting device of the present invention is employed.

The liquid crystal unit employs birefringence of liquid crystals, and comprises a counter substrate having a colored layer, a light-shielding layer, counter electrodes and the like provided on an insulating substrate such as glass, and a TFT array substrate having a thin film transistor (hereinafter referred to as TFT) as a switching element, pixel electrodes and the like provided on the insulating substrate such as glass. Further, it has a spacer to maintain a space between the counter substrate and the TFT array substrate, a sealing material to bond the counter substrate and the TFT array substrate, liquid crystals sandwiched between the counter substrate and the TFT array substrate, a sealing material for an inlet through which the liquid crystals are injected, an alignment film to align the liquid crystals, a polarizing plate, and the like.

EXAMPLES

With respect to glass plates having the glass composition and the effective light path length L (cm) as identified in the following Tables (Tables 1 to 7), the average internal transmittance $T_{Ave}$ in the visible region and the chromaticity Y of tristimulus values in the XYZ colorimetric system as defined in JIS Z8701 (Appendix) under the effective optical path length were obtained.

Further, the value of L×A (cm·ppm), where L (cm) is the effective optical path length of the glass plate and A (mass ppm) is the content of total iron as calculated as $Fe_2O_3$ of the glass plate, is shown in each Table.

Further, the value of L×B (cm·ppm), where L (cm) is the effective optical path length of the glass plate and B (mass ppm) is the content of $Fe^{2+}$ as calculated as $Fe_2O_3$ in total iron as calculated as $Fe_2O_3$ of the glass plate, is shown in each Table.

The glass compositions shown in Tables 1 to 4 fall into the category of the above-described constitution example A of the glass plate of the present invention, the glass compositions shown in Table 6 fall into the category of the constitution example C of the glass plate of the present invention, and the glass compositions shown in Table 7 fall into the category of the above-described constitution example B of the glass plate of the present invention.

Further, Ex. 38 in Table 2 and Ex. 41, 43 and 45 in Table 3 are Reference Examples.

TABLE 1

| | mass % | | | | | | mass ppm | | | FeO(B) in $Fe_2O_3(A)$ | L (cm) | L × A (cm · ppm) | L × B (cm · ppm) | $T_{Ave}$ (%) | Y (%) |
|---|---|---|---|---|---|---|---|---|---|---|---|---|---|---|---|
| | $SiO_2$ | $Al_2O_3$ | MgO | CaO | $Na_2O$ | $K_2O$ | $Sb_2O_3$ | $CeO_2$ | $Fe_2O_3(A)$ | | | | | | |
| Ex. 1 | 71.6 | 0.97 | 3.6 | 9.3 | 13.9 | 0.05 | 0 | 0 | 5 | 1.0 | 200 | 1000 | 200 | 90.9 | 95.6 |
| Ex. 2 | 71.6 | 0.97 | 3.6 | 9.3 | 13.9 | 0.05 | 0 | 0 | 5 | 1.0 | 100 | 500 | 100 | 95.3 | 97.8 |
| Ex. 3 | 71.6 | 0.97 | 3.6 | 9.3 | 13.9 | 0.05 | 0 | 0 | 5 | 1.0 | 50 | 250 | 50 | 97.6 | 98.9 |
| Ex. 4 | 71.6 | 0.97 | 3.6 | 9.3 | 13.9 | 0.05 | 0 | 0 | 5 | 1.0 | 25 | 125 | 25 | 98.8 | 99.4 |
| Ex. 5 | 71.6 | 0.97 | 3.6 | 9.3 | 13.9 | 0.05 | 0 | 0 | 20 | 4.1 | 100 | 2000 | 410 | 82.9 | 91.5 |
| Ex. 6 | 71.6 | 0.97 | 3.6 | 9.3 | 13.9 | 0.05 | 0 | 0 | 20 | 4.1 | 50 | 1000 | 205 | 90.9 | 95.6 |
| Ex. 7 | 71.6 | 0.97 | 3.6 | 9.3 | 13.9 | 0.05 | 0 | 0 | 20 | 4.1 | 25 | 500 | 103 | 95.3 | 97.8 |
| Ex. 8 | 71.6 | 0.97 | 3.6 | 9.3 | 13.9 | 0.05 | 0 | 0 | 50 | 10.2 | 25 | 1250 | 255 | 88.8 | 94.6 |
| Ex. 9 | 71.6 | 0.97 | 3.6 | 9.3 | 13.9 | 0.05 | 0 | 0 | 50 | 10.2 | 45 | 2250 | 459 | 81.1 | 90.5 |
| Ex. 10 | 71.6 | 0.97 | 3.6 | 9.3 | 13.9 | 0.05 | 0 | 0 | 80 | 16.3 | 25 | 2000 | 408 | 82.9 | 91.5 |
| Ex. 11 | 71.6 | 0.97 | 3.6 | 9.3 | 13.9 | 0.05 | 250 | 0 | 5 | 0.6 | 200 | 1000 | 120 | 94.3 | 98.3 |
| Ex. 12 | 71.6 | 0.97 | 3.6 | 9.3 | 13.9 | 0.05 | 250 | 0 | 5 | 0.6 | 100 | 500 | 60 | 97.1 | 99.2 |
| Ex. 13 | 71.6 | 0.97 | 3.6 | 9.3 | 13.9 | 0.05 | 250 | 0 | 5 | 0.6 | 50 | 250 | 30 | 98.5 | 99.6 |
| Ex. 14 | 71.6 | 0.97 | 3.6 | 9.3 | 13.9 | 0.05 | 250 | 0 | 20 | 2.5 | 200 | 4000 | 500 | 80.2 | 93.7 |
| Ex. 15 | 71.6 | 0.97 | 3.6 | 9.3 | 13.9 | 0.05 | 250 | 0 | 20 | 2.5 | 100 | 2000 | 250 | 89.2 | 96.7 |
| Ex. 16 | 71.6 | 0.97 | 3.6 | 9.3 | 13.9 | 0.05 | 250 | 0 | 20 | 2.5 | 50 | 1000 | 125 | 94.3 | 98.3 |
| Ex. 17 | 71.6 | 0.97 | 3.6 | 9.3 | 13.9 | 0.05 | 250 | 0 | 20 | 2.5 | 25 | 500 | 63 | 97.1 | 99.2 |
| Ex. 18 | 71.6 | 0.97 | 3.6 | 9.3 | 13.9 | 0.05 | 250 | 0 | 50 | 6.4 | 80 | 4000 | 512 | 80.2 | 93.7 |
| Ex. 19 | 71.6 | 0.97 | 3.6 | 9.3 | 13.9 | 0.05 | 250 | 0 | 50 | 6.4 | 40 | 2000 | 256 | 89.2 | 96.7 |
| Ex. 20 | 71.6 | 0.97 | 3.6 | 9.3 | 13.9 | 0.05 | 250 | 0 | 50 | 6.4 | 25 | 1250 | 160 | 93 | 97.9 |

TABLE 2

| | mass % | | | | | | mass ppm | | | FeO(B) in $Fe_2O_3(A)$ | L (cm) | L × A (cm · ppm) | L × B (cm · ppm) | $T_{Ave}$ (%) | Y (%) |
|---|---|---|---|---|---|---|---|---|---|---|---|---|---|---|---|
| | $SiO_2$ | $Al_2O_3$ | MgO | CaO | $Na_2O$ | $K_2O$ | $Sb_2O_3$ | $CeO_2$ | $Fe_2O_3(A)$ | | | | | | |
| Ex. 21 | 71.6 | 0.97 | 3.6 | 9.3 | 13.9 | 0.05 | 250 | 0 | 80 | 10.2 | 50 | 4000 | 510 | 80.2 | 93.7 |
| Ex. 22 | 71.6 | 0.97 | 3.6 | 9.3 | 13.9 | 0.05 | 250 | 0 | 150 | 19.1 | 25 | 3750 | 478 | 81.3 | 94 |
| Ex. 23 | 71.6 | 0.97 | 3.6 | 9.3 | 13.9 | 0.05 | 2000 | 0 | 5 | 0.4 | 200 | 1000 | 80 | 94.9 | 97.3 |
| Ex. 24 | 71.6 | 0.97 | 3.6 | 9.3 | 13.9 | 0.05 | 2000 | 0 | 5 | 0.4 | 100 | 500 | 40 | 97.4 | 98.7 |
| Ex. 25 | 71.6 | 0.97 | 3.6 | 9.3 | 13.9 | 0.05 | 2000 | 0 | 5 | 0.4 | 25 | 125 | 10 | 99.3 | 99.7 |
| Ex. 26 | 71.6 | 0.97 | 3.6 | 9.3 | 13.9 | 0.05 | 2000 | 0 | 20 | 1.5 | 200 | 4000 | 300 | 81.4 | 89.9 |
| Ex. 27 | 71.6 | 0.97 | 3.6 | 9.3 | 13.9 | 0.05 | 2000 | 0 | 20 | 1.5 | 100 | 2000 | 150 | 90.1 | 94.8 |
| Ex. 28 | 71.6 | 0.97 | 3.6 | 9.3 | 13.9 | 0.05 | 2000 | 0 | 20 | 1.5 | 70 | 1400 | 105 | 92.9 | 96.3 |
| Ex. 29 | 71.6 | 0.97 | 3.6 | 9.3 | 13.9 | 0.05 | 2000 | 0 | 20 | 1.5 | 25 | 500 | 38 | 97.4 | 98.7 |
| Ex. 30 | 71.6 | 0.97 | 3.6 | 9.3 | 13.9 | 0.05 | 2000 | 0 | 50 | 3.7 | 80 | 4000 | 296 | 81.4 | 90.3 |
| Ex. 31 | 71.6 | 0.97 | 3.6 | 9.3 | 13.9 | 0.05 | 2000 | 0 | 50 | 3.7 | 25 | 1250 | 93 | 93.6 | 96.7 |
| Ex. 32 | 71.6 | 0.97 | 3.6 | 9.3 | 13.9 | 0.05 | 2000 | 0 | 100 | 7.4 | 40 | 4000 | 296 | 81.4 | 89.9 |
| Ex. 33 | 71.6 | 0.97 | 3.6 | 9.3 | 13.9 | 0.05 | 2000 | 0 | 100 | 7.4 | 25 | 2500 | 185 | 87.8 | 93.5 |
| Ex. 34 | 71.6 | 0.97 | 3.6 | 9.3 | 13.9 | 0.05 | 2000 | 0 | 150 | 11.0 | 25 | 3750 | 275 | 81.3 | 90.3 |
| Ex. 35 | 71.6 | 0.97 | 3.6 | 9.3 | 13.9 | 0.05 | 2000 | 0 | 5 | 0.4 | 200 | 1000 | 80 | 93.1 | 95.7 |
| Ex. 36 | 71.6 | 0.97 | 3.6 | 9.3 | 13.9 | 0.05 | 2000 | 0 | 5 | 0.4 | 100 | 500 | 40 | 96.5 | 97.8 |
| Ex. 37 | 71.6 | 0.97 | 3.6 | 9.3 | 13.9 | 0.05 | 2000 | 0 | 5 | 0.4 | 70 | 350 | 28 | 97.5 | 98.5 |
| Ex. 38 | 71.6 | 0.97 | 3.6 | 9.3 | 13.9 | 0.05 | 2000 | 0 | 20 | 1.7 | 150 | 3000 | 255 | 81 | 87.7 |
| Ex. 39 | 71.6 | 0.97 | 3.6 | 9.3 | 13.9 | 0.05 | 2000 | 0 | 20 | 1.7 | 100 | 2000 | 170 | 86.8 | 91.6 |
| Ex. 40 | 71.6 | 0.97 | 3.6 | 9.3 | 13.9 | 0.05 | 2000 | 0 | 20 | 1.7 | 25 | 500 | 43 | 96.5 | 97.8 |

TABLE 3

| | mass % | | | | | | mass ppm | | | FeO(B) in Fe$_2$O$_3$(A) | L (cm) | L × A (cm · ppm) | L × B (cm · ppm) | T$_{Ave}$ (%) | Y (%) |
|---|---|---|---|---|---|---|---|---|---|---|---|---|---|---|---|
| | SiO$_2$ | Al$_2$O$_3$ | MgO | CaO | Na$_2$O | K$_2$O | Sb$_2$O$_3$ | CeO$_2$ | Fe$_2$O$_3$(A) | | | | | | |
| Ex. 41 | 71.6 | 0.97 | 3.6 | 9.3 | 13.9 | 0.05 | 2000 | 0 | 50 | 4.2 | 50 | 2500 | 210 | 83.8 | 89.6 |
| Ex. 42 | 71.6 | 0.97 | 3.6 | 9.3 | 13.9 | 0.05 | 2000 | 0 | 50 | 4.2 | 25 | 1250 | 105 | 91.5 | 94.4 |
| Ex. 43 | 71.6 | 0.97 | 3.6 | 9.3 | 13.9 | 0.05 | 2000 | 0 | 80 | 6.8 | 35 | 2800 | 238 | 82.1 | 88.5 |
| Ex. 44 | 71.6 | 0.97 | 3.6 | 9.3 | 13.9 | 0.05 | 2000 | 0 | 80 | 6.8 | 25 | 2000 | 170 | 86.8 | 91.6 |
| Ex. 45 | 71.6 | 0.97 | 3.6 | 9.3 | 13.9 | 0.05 | 2000 | 0 | 120 | 10.2 | 25 | 3000 | 255 | 81 | 87.7 |
| Ex. 46 | 71.6 | 0.97 | 3.6 | 9.3 | 13.9 | 0.05 | 0 | 200 | 5 | 0.2 | 200 | 1000 | 40 | 95.8 | 98.3 |
| Ex. 47 | 71.6 | 0.97 | 3.6 | 9.3 | 13.9 | 0.05 | 0 | 200 | 5 | 0.2 | 100 | 500 | 20 | 97.9 | 99.2 |
| Ex. 48 | 71.6 | 0.97 | 3.6 | 9.3 | 13.9 | 0.05 | 0 | 200 | 5 | 0.2 | 50 | 250 | 10 | 98.9 | 99.6 |
| Ex. 49 | 71.6 | 0.97 | 3.6 | 9.3 | 13.9 | 0.05 | 0 | 200 | 5 | 0.2 | 25 | 125 | 5 | 99.5 | 99.8 |
| Ex. 50 | 71.6 | 0.97 | 3.6 | 9.3 | 13.9 | 0.05 | 0 | 200 | 20 | 0.9 | 200 | 4000 | 180 | 85 | 93.6 |
| Ex. 51 | 71.6 | 0.97 | 3.6 | 9.3 | 13.9 | 0.05 | 0 | 200 | 20 | 0.9 | 100 | 2000 | 90 | 92 | 96.7 |
| Ex. 52 | 71.6 | 0.97 | 3.6 | 9.3 | 13.9 | 0.05 | 0 | 200 | 20 | 0.9 | 50 | 1000 | 45 | 95.8 | 98.3 |
| Ex. 53 | 71.6 | 0.97 | 3.6 | 9.3 | 13.9 | 0.05 | 0 | 200 | 20 | 0.9 | 25 | 500 | 23 | 97.9 | 99.2 |
| Ex. 54 | 71.6 | 0.97 | 3.6 | 9.3 | 13.9 | 0.05 | 0 | 200 | 50 | 2.2 | 100 | 5000 | 220 | 81.8 | 92.3 |
| Ex. 55 | 71.6 | 0.97 | 3.6 | 9.3 | 13.9 | 0.05 | 0 | 200 | 50 | 2.2 | 50 | 2500 | 110 | 90.1 | 95.9 |
| Ex. 56 | 71.6 | 0.97 | 3.6 | 9.3 | 13.9 | 0.05 | 0 | 200 | 50 | 2.2 | 25 | 1250 | 55 | 94.8 | 98 |
| Ex. 57 | 71.6 | 0.97 | 3.6 | 9.3 | 13.9 | 0.05 | 0 | 200 | 80 | 3.5 | 70 | 5600 | 245 | 80 | 91.2 |
| Ex. 58 | 71.6 | 0.97 | 3.6 | 9.3 | 13.9 | 0.05 | 0 | 200 | 80 | 3.5 | 25 | 2000 | 88 | 92 | 96.8 |
| Ex. 59 | 71.6 | 0.97 | 3.6 | 9.3 | 13.9 | 0.05 | 0 | 200 | 150 | 6.5 | 25 | 3750 | 163 | 85.8 | 93.9 |
| Ex. 60 | 71.9 | 0.85 | 0 | 10.7 | 16.5 | 0 | 500 | 0 | 5 | 0.5 | 200 | 1000 | 100 | 94.4 | 97.9 |

TABLE 4

| | mass % | | | | | | mass ppm | | | FeO(B) in Fe$_2$O$_3$(A) | L (cm) | L × A (cm · ppm) | L × B (cm · ppm) | T$_{Ave}$ (%) | Y (%) |
|---|---|---|---|---|---|---|---|---|---|---|---|---|---|---|---|
| | SiO$_2$ | Al$_2$O$_3$ | MgO | CaO | Na$_2$O | K$_2$O | Sb$_2$O$_3$ | CeO$_2$ | Fe$_2$O$_3$(A) | | | | | | |
| Ex. 61 | 71.9 | 0.85 | 0 | 10.7 | 16.5 | 0 | 500 | 0 | 5 | 0.5 | 100 | 500 | 50 | 97.1 | 98.9 |
| Ex. 62 | 71.9 | 0.85 | 0 | 10.7 | 16.5 | 0 | 500 | 0 | 5 | 0.5 | 25 | 125 | 13 | 99.3 | 99.7 |
| Ex. 63 | 71.9 | 0.85 | 0 | 10.7 | 16.5 | 0 | 500 | 0 | 20 | 2.0 | 200 | 4000 | 400 | 80.2 | 91.9 |
| Ex. 64 | 71.9 | 0.85 | 0 | 10.7 | 16.5 | 0 | 500 | 0 | 20 | 2.0 | 100 | 2000 | 200 | 89.3 | 95.8 |
| Ex. 65 | 71.9 | 0.85 | 0 | 10.7 | 16.5 | 0 | 500 | 0 | 20 | 2.0 | 50 | 1000 | 100 | 94.4 | 97.9 |
| Ex. 66 | 71.9 | 0.85 | 0 | 10.7 | 16.5 | 0 | 500 | 0 | 50 | 4.9 | 80 | 4000 | 392 | 80.2 | 91.9 |
| Ex. 67 | 71.9 | 0.85 | 0 | 10.7 | 16.5 | 0 | 500 | 0 | 50 | 4.9 | 50 | 2500 | 245 | 86.9 | 94.8 |
| Ex. 68 | 71.9 | 0.85 | 0 | 10.7 | 16.5 | 0 | 500 | 0 | 50 | 4.9 | 25 | 1250 | 123 | 93.1 | 97.4 |
| Ex. 69 | 71.9 | 0.85 | 0 | 10.7 | 16.5 | 0 | 500 | 0 | 100 | 9.8 | 40 | 4000 | 392 | 80.2 | 91.9 |
| Ex. 70 | 71.9 | 0.85 | 0 | 10.7 | 16.5 | 0 | 500 | 0 | 150 | 14.7 | 25 | 3750 | 368 | 81.3 | 92.3 |
| Ex. 71 | 71.8 | 1.74 | 6.9 | 4.8 | 14.7 | 0 | 500 | 0 | 5 | 0.4 | 200 | 1000 | 80 | 95.5 | 98.8 |
| Ex. 72 | 71.8 | 1.74 | 6.9 | 4.8 | 14.7 | 0 | 500 | 0 | 5 | 0.4 | 100 | 500 | 40 | 97.7 | 99.4 |
| Ex. 73 | 71.8 | 1.74 | 6.9 | 4.8 | 14.7 | 0 | 500 | 0 | 5 | 0.4 | 25 | 125 | 10 | 99.4 | 99.8 |
| Ex. 74 | 71.8 | 1.74 | 6.9 | 4.8 | 14.7 | 0 | 500 | 0 | 20 | 1.6 | 200 | 4000 | 320 | 83.8 | 95.3 |
| Ex. 75 | 71.8 | 1.74 | 6.9 | 4.8 | 14.7 | 0 | 500 | 0 | 20 | 1.6 | 100 | 2000 | 160 | 91.3 | 97.6 |
| Ex. 76 | 71.8 | 1.74 | 6.9 | 4.8 | 14.7 | 0 | 500 | 0 | 20 | 1.6 | 50 | 1000 | 80 | 95.5 | 98.8 |
| Ex. 77 | 71.8 | 1.74 | 6.9 | 4.8 | 14.7 | 0 | 500 | 0 | 20 | 1.6 | 25 | 500 | 40 | 97.7 | 99.4 |
| Ex. 78 | 71.8 | 1.74 | 6.9 | 4.8 | 14.7 | 0 | 500 | 0 | 50 | 4.1 | 100 | 5000 | 410 | 80.4 | 94.2 |
| Ex. 79 | 71.8 | 1.74 | 6.9 | 4.8 | 14.7 | 0 | 500 | 0 | 50 | 4.1 | 50 | 2500 | 205 | 89.4 | 97 |
| Ex. 80 | 71.8 | 1.74 | 6.9 | 4.8 | 14.7 | 0 | 500 | 0 | 50 | 4.1 | 25 | 1250 | 103 | 94.4 | 98.5 |
| Ex. 81 | 71.8 | 1.74 | 6.9 | 4.8 | 14.7 | 0 | 500 | 0 | 100 | 8.2 | 50 | 5000 | 410 | 80.4 | 94.2 |
| Ex. 82 | 71.8 | 1.74 | 6.9 | 4.8 | 14.7 | 0 | 500 | 0 | 100 | 8.2 | 25 | 2500 | 205 | 89.4 | 97 |
| Ex. 83 | 71.8 | 1.74 | 6.9 | 4.8 | 14.7 | 0 | 500 | 0 | 150 | 12.4 | 30 | 4500 | 372 | 82.1 | 94.7 |

TABLE 5

| | mass % | | | | | | | | mass ppm | FeO(B) in | L | L × A | L × B | $T_{Ave}$ | Y |
| | $SiO_2$ | $Al_2O_3$ | MgO | CaO | $Na_2O$ | $K_2O$ | $Sb_2O_3$ | $CeO_2$ | $Fe_2O_3$(A) | $Fe_2O_3$(A) | (cm) | (cm · ppm) | (cm · ppm) | (%) | (%) |
|---|---|---|---|---|---|---|---|---|---|---|---|---|---|---|---|
| Comp. Ex. 1 | 71.6 | 0.97 | 3.6 | 9.3 | 13.9 | 0.05 | 0 | 0 | 500 | 67.8 | 25 | 12500 | 1695 | 25.3 | 40.7 |
| Comp. Ex. 2 | 71.6 | 0.97 | 3.6 | 9.3 | 13.9 | 0.05 | 0 | 0 | 500 | 103.8 | 25 | 12500 | 2595 | 34.8 | 53.3 |
| Comp. Ex. 3 | 71.6 | 0.97 | 3.6 | 9.3 | 13.9 | 0.05 | 0 | 0 | 1000 | 207.5 | 25 | 25000 | 5188 | 17.2 | 30.2 |

TABLE 6

| | mass % | | | | | | | | | mass ppm | FeO(B) in | L | L × A | L × B | $T_{Ave}$ | Y |
| | $SiO_2$ | $Al_2O_3$ | $Na_2O$ | $K_2O$ | CaO | MgO | SrO | BaO | $B_2O_3$ | $Fe_2O_3$(A) | $Fe_2O_3$(A) | (cm) | (cm · ppm) | (cm · ppm) | (%) | (%) |
|---|---|---|---|---|---|---|---|---|---|---|---|---|---|---|---|---|
| Ex. 84 | 63.4 | 17.8 | 0.0 | 0.0 | 7.9 | 1.6 | 0.8 | 0.0 | 8.5 | 130 | 40.3 | 25 | 3250 | 1008 | 80.5 | 94.6 |
| Ex. 85 | 63.4 | 17.8 | 0.0 | 0.0 | 7.9 | 1.6 | 0.8 | 0.0 | 8.5 | 100 | 31.0 | 25 | 2500 | 775 | 84.7 | 95.9 |
| Ex. 86 | 63.4 | 17.8 | 0.0 | 0.0 | 7.9 | 1.6 | 0.8 | 0.0 | 8.5 | 50 | 15.5 | 50 | 2500 | 775 | 84.7 | 95.9 |
| Ex. 87 | 63.4 | 17.8 | 0.0 | 0.0 | 7.9 | 1.6 | 0.8 | 0.0 | 8.5 | 50 | 15.5 | 25 | 1250 | 388 | 92.0 | 97.9 |
| Ex. 88 | 63.4 | 17.8 | 0.0 | 0.0 | 7.9 | 1.6 | 0.8 | 0.0 | 8.5 | 10 | 3.1 | 200 | 2000 | 620 | 87.5 | 96.7 |
| Ex. 89 | 63.4 | 17.8 | 0.0 | 0.0 | 7.9 | 1.6 | 0.8 | 0.0 | 8.5 | 10 | 3.1 | 100 | 1000 | 310 | 93.6 | 98.3 |
| Ex. 90 | 63.4 | 17.8 | 0.0 | 0.0 | 7.9 | 1.6 | 0.8 | 0.0 | 8.5 | 10 | 3.1 | 50 | 500 | 155 | 96.7 | 99.2 |
| Ex. 91 | 63.4 | 17.8 | 0.0 | 0.0 | 7.9 | 1.6 | 0.8 | 0.0 | 8.5 | 10 | 3.1 | 25 | 250 | 78 | 98.3 | 99.6 |
| Ex. 92 | 63.4 | 17.8 | 0.0 | 0.0 | 7.9 | 1.6 | 0.8 | 0.0 | 8.5 | 90 | 41.0 | 25 | 2250 | 1026 | 80.5 | 93.2 |
| Ex. 93 | 63.4 | 17.8 | 0.0 | 0.0 | 7.9 | 1.6 | 0.8 | 0.0 | 8.5 | 40 | 18.2 | 50 | 2000 | 912 | 82.5 | 93.9 |
| Ex. 94 | 63.4 | 17.8 | 0.0 | 0.0 | 7.9 | 1.6 | 0.8 | 0.0 | 8.5 | 50 | 22.8 | 25 | 1250 | 570 | 88.7 | 96.1 |
| Ex. 95 | 63.4 | 17.8 | 0.0 | 0.0 | 7.9 | 1.6 | 0.8 | 0.0 | 8.5 | 10 | 4.6 | 200 | 2000 | 912 | 82.5 | 93.9 |
| Ex. 96 | 63.4 | 17.8 | 0.0 | 0.0 | 7.9 | 1.6 | 0.8 | 0.0 | 8.5 | 10 | 4.6 | 100 | 1000 | 456 | 90.8 | 96.9 |
| Ex. 97 | 63.4 | 17.8 | 0.0 | 0.0 | 7.9 | 1.6 | 0.8 | 0.0 | 8.5 | 10 | 4.6 | 50 | 500 | 228 | 95.3 | 98.4 |
| Ex. 98 | 63.4 | 17.8 | 0.0 | 0.0 | 7.9 | 1.6 | 0.8 | 0.0 | 8.5 | 10 | 4.6 | 25 | 250 | 114 | 97.6 | 99.2 |
| Ex. 99 | 61.9 | 19.0 | 0.0 | 0.0 | 4.2 | 2.0 | 2.1 | 8.0 | 2.6 | 100 | 35.3 | 25 | 2500 | 882 | 82.2 | 95.4 |
| Ex. 100 | 61.9 | 19.0 | 0.0 | 0.0 | 4.2 | 2.0 | 2.1 | 8.0 | 2.6 | 50 | 17.6 | 50 | 2500 | 882 | 82.2 | 95.4 |
| Ex. 101 | 61.9 | 19.0 | 0.0 | 0.0 | 4.2 | 2.0 | 2.1 | 8.0 | 2.6 | 50 | 17.6 | 25 | 1250 | 441 | 90.6 | 97.7 |
| Ex. 102 | 61.9 | 19.0 | 0.0 | 0.0 | 4.2 | 2.0 | 2.1 | 8.0 | 2.6 | 10 | 3.5 | 200 | 2000 | 706 | 85.5 | 96.3 |
| Ex. 103 | 61.9 | 19.0 | 0.0 | 0.0 | 4.2 | 2.0 | 2.1 | 8.0 | 2.6 | 10 | 3.5 | 100 | 1000 | 353 | 92.4 | 98.1 |
| Ex. 104 | 61.9 | 19.0 | 0.0 | 0.0 | 4.2 | 2.0 | 2.1 | 8.0 | 2.6 | 10 | 3.5 | 50 | 500 | 176 | 96.1 | 99.1 |
| Ex. 105 | 61.9 | 19.0 | 0.0 | 0.0 | 4.2 | 2.0 | 2.1 | 8.0 | 2.6 | 10 | 3.5 | 25 | 250 | 88 | 98.1 | 99.5 |
| Ex. 106 | 61.9 | 19.0 | 0.0 | 0.0 | 4.2 | 2.0 | 2.1 | 8.0 | 2.6 | 80 | 51.1 | 25 | 2000 | 1278 | 82.3 | 95.2 |
| Ex. 107 | 61.9 | 19.0 | 0.0 | 0.0 | 4.2 | 2.0 | 2.1 | 8.0 | 2.6 | 40 | 25.6 | 50 | 2000 | 1278 | 82.3 | 95.2 |
| Ex. 108 | 61.9 | 19.0 | 0.0 | 0.0 | 4.2 | 2.0 | 2.1 | 8.0 | 2.6 | 50 | 31.9 | 25 | 1250 | 798 | 88.6 | 96.9 |
| Ex. 109 | 61.9 | 19.0 | 0.0 | 0.0 | 4.2 | 2.0 | 2.1 | 8.0 | 2.6 | 10 | 6.4 | 200 | 2000 | 1278 | 82.3 | 95.2 |
| Ex. 110 | 61.9 | 19.0 | 0.0 | 0.0 | 4.2 | 2.0 | 2.1 | 8.0 | 2.6 | 10 | 6.4 | 100 | 1000 | 639 | 90.7 | 97.5 |
| Ex. 111 | 61.9 | 19.0 | 0.0 | 0.0 | 4.2 | 2.0 | 2.1 | 8.0 | 2.6 | 10 | 6.4 | 50 | 500 | 319 | 95.3 | 98.8 |
| Ex. 112 | 61.9 | 19.0 | 0.0 | 0.0 | 4.2 | 2.0 | 2.1 | 8.0 | 2.6 | 10 | 6.4 | 25 | 250 | 160 | 97.6 | 99.4 |

TABLE 7

| | mass % | | | | | | | | | mass ppm | FeO(B) in | L | L × A | L × B | $T_{Ave}$ | Y |
| | $SiO_2$ | $Al_2O_3$ | $Na_2O$ | $K_2O$ | CaO | MgO | SrO | BaO | $B_2O_3$ | $Fe_2O_3$(A) | $Fe_2O_3$(A) | (cm) | (cm · ppm) | (cm · ppm) | (%) | (%) |
|---|---|---|---|---|---|---|---|---|---|---|---|---|---|---|---|---|
| Ex. 113 | 64.1 | 17.4 | 14.6 | 0.0 | 0.0 | 3.7 | 0.0 | 0.0 | 0.0 | 130 | 12.4 | 25 | 3250 | 309 | 80.8 | 93.9 |
| Ex. 114 | 64.1 | 17.4 | 14.6 | 0.0 | 0.0 | 3.7 | 0.0 | 0.0 | 0.0 | 100 | 9.5 | 25 | 2500 | 238 | 84.9 | 95.3 |
| Ex. 115 | 64.1 | 17.4 | 14.6 | 0.0 | 0.0 | 3.7 | 0.0 | 0.0 | 0.0 | 50 | 4.8 | 50 | 2500 | 238 | 84.9 | 95.3 |
| Ex. 116 | 64.1 | 17.4 | 14.6 | 0.0 | 0.0 | 3.7 | 0.0 | 0.0 | 0.0 | 50 | 4.8 | 25 | 1250 | 119 | 92.1 | 97.6 |
| Ex. 117 | 64.1 | 17.4 | 14.6 | 0.0 | 0.0 | 3.7 | 0.0 | 0.0 | 0.0 | 10 | 1.0 | 200 | 2000 | 190 | 87.7 | 96.2 |
| Ex. 118 | 64.1 | 17.4 | 14.6 | 0.0 | 0.0 | 3.7 | 0.0 | 0.0 | 0.0 | 10 | 1.0 | 100 | 1000 | 95 | 93.6 | 98.1 |
| Ex. 119 | 64.1 | 17.4 | 14.6 | 0.0 | 0.0 | 3.7 | 0.0 | 0.0 | 0.0 | 10 | 1.0 | 50 | 500 | 48 | 96.8 | 99.0 |
| Ex. 120 | 64.1 | 17.4 | 14.6 | 0.0 | 0.0 | 3.7 | 0.0 | 0.0 | 0.0 | 10 | 1.0 | 30 | 300 | 29 | 98.0 | 99.4 |
| Ex. 121 | 64.1 | 17.4 | 14.6 | 0.0 | 0.0 | 3.7 | 0.0 | 0.0 | 0.0 | 130 | 21.2 | 25 | 3250 | 530 | 80.5 | 93.1 |
| Ex. 122 | 64.1 | 17.4 | 14.6 | 0.0 | 0.0 | 3.7 | 0.0 | 0.0 | 0.0 | 100 | 16.3 | 25 | 2500 | 408 | 84.6 | 94.7 |
| Ex. 123 | 64.1 | 17.4 | 14.6 | 0.0 | 0.0 | 3.7 | 0.0 | 0.0 | 0.0 | 50 | 8.2 | 50 | 2500 | 408 | 84.6 | 94.7 |
| Ex. 124 | 64.1 | 17.4 | 14.6 | 0.0 | 0.0 | 3.7 | 0.0 | 0.0 | 0.0 | 50 | 8.2 | 25 | 1250 | 204 | 92.0 | 97.3 |
| Ex. 125 | 64.1 | 17.4 | 14.6 | 0.0 | 0.0 | 3.7 | 0.0 | 0.0 | 0.0 | 10 | 1.6 | 200 | 2000 | 326 | 87.5 | 95.7 |

TABLE 7-continued

| | mass % | | | | | | | | | mass ppm Fe$_2$O$_3$(A) | FeO(B) in Fe$_2$O$_3$(A) | L (cm) | L × A (cm·ppm) | L × B (cm·ppm) | T$_{Ave}$ (%) | Y (%) |
|---|---|---|---|---|---|---|---|---|---|---|---|---|---|---|---|---|
| | SiO$_2$ | Al$_2$O$_3$ | Na$_2$O | K$_2$O | CaO | MgO | SrO | BaO | B$_2$O$_3$ | | | | | | | |
| Ex. 126 | 64.1 | 17.4 | 14.6 | 0.0 | 0.0 | 3.7 | 0.0 | 0.0 | 0.0 | 10 | 1.6 | 100 | 1000 | 163 | 93.5 | 97.8 |
| Ex. 127 | 64.1 | 17.4 | 14.6 | 0.0 | 0.0 | 3.7 | 0.0 | 0.0 | 0.0 | 10 | 1.6 | 50 | 500 | 82 | 96.7 | 98.9 |
| Ex. 128 | 64.1 | 17.4 | 14.6 | 0.0 | 0.0 | 3.7 | 0.0 | 0.0 | 0.0 | 10 | 1.6 | 25 | 250 | 41 | 98.3 | 99.5 |
| Ex. 129 | 61.2 | 20.4 | 12.9 | 0.2 | 0.0 | 1.4 | 0.0 | 0.0 | 3.7 | 140 | 27.4 | 25 | 3500 | 685 | 81.2 | 93.8 |
| Ex. 130 | 61.2 | 20.4 | 12.9 | 0.2 | 0.0 | 1.4 | 0.0 | 0.0 | 3.7 | 100 | 19.6 | 25 | 2500 | 489 | 86.1 | 95.5 |
| Ex. 131 | 61.2 | 20.4 | 12.9 | 0.2 | 0.0 | 1.4 | 0.0 | 0.0 | 3.7 | 50 | 9.8 | 50 | 2500 | 489 | 86.1 | 95.5 |
| Ex. 132 | 61.2 | 20.4 | 12.9 | 0.2 | 0.0 | 1.4 | 0.0 | 0.0 | 3.7 | 50 | 9.8 | 25 | 1250 | 245 | 92.8 | 97.7 |
| Ex. 133 | 61.2 | 20.4 | 12.9 | 0.2 | 0.0 | 1.4 | 0.0 | 0.0 | 3.7 | 10 | 2.0 | 200 | 2000 | 391 | 88.8 | 96.4 |
| Ex. 134 | 61.2 | 20.4 | 12.9 | 0.2 | 0.0 | 1.4 | 0.0 | 0.0 | 3.7 | 10 | 2.0 | 100 | 1000 | 196 | 94.2 | 98.2 |
| Ex. 135 | 61.2 | 20.4 | 12.9 | 0.2 | 0.0 | 1.4 | 0.0 | 0.0 | 3.7 | 10 | 2.0 | 50 | 500 | 98 | 97.1 | 99.1 |
| Ex. 136 | 61.2 | 20.4 | 12.9 | 0.2 | 0.0 | 1.4 | 0.0 | 0.0 | 3.7 | 10 | 2.0 | 25 | 250 | 49 | 98.5 | 99.5 |
| Ex. 137 | 61.2 | 20.4 | 12.9 | 0.2 | 0.0 | 1.4 | 0.0 | 0.0 | 3.7 | 150 | 29.4 | 25 | 3750 | 735 | 81.3 | 95.1 |
| Ex. 138 | 61.2 | 20.4 | 12.9 | 0.2 | 0.0 | 1.4 | 0.0 | 0.0 | 3.7 | 100 | 19.6 | 40 | 4000 | 784 | 80.2 | 94.8 |
| Ex. 139 | 61.2 | 20.4 | 12.9 | 0.2 | 0.0 | 1.4 | 0.0 | 0.0 | 3.7 | 100 | 19.6 | 25 | 2500 | 490 | 87.1 | 96.7 |
| Ex. 140 | 61.2 | 20.4 | 12.9 | 0.2 | 0.0 | 1.4 | 0.0 | 0.0 | 3.7 | 50 | 9.8 | 80 | 4000 | 784 | 80.2 | 94.8 |
| Ex. 141 | 61.2 | 20.4 | 12.9 | 0.2 | 0.0 | 1.4 | 0.0 | 0.0 | 3.7 | 50 | 9.8 | 50 | 2500 | 490 | 87.1 | 96.7 |
| Ex. 142 | 61.2 | 20.4 | 12.9 | 0.2 | 0.0 | 1.4 | 0.0 | 0.0 | 3.7 | 50 | 9.8 | 25 | 1250 | 245 | 93.3 | 98.4 |
| Ex. 143 | 61.2 | 20.4 | 12.9 | 0.2 | 0.0 | 1.4 | 0.0 | 0.0 | 3.7 | 10 | 2.0 | 200 | 2000 | 392 | 89.5 | 97.4 |
| Ex. 144 | 61.2 | 20.4 | 12.9 | 0.2 | 0.0 | 1.4 | 0.0 | 0.0 | 3.7 | 10 | 2.0 | 100 | 1000 | 196 | 94.6 | 98.7 |
| Ex. 145 | 61.2 | 20.4 | 12.9 | 0.2 | 0.0 | 1.4 | 0.0 | 0.0 | 3.7 | 10 | 2.0 | 50 | 500 | 98 | 97.3 | 99.3 |
| Ex. 146 | 61.2 | 20.4 | 12.9 | 0.2 | 0.0 | 1.4 | 0.0 | 0.0 | 3.7 | 10 | 2.0 | 25 | 250 | 49 | 98.6 | 99.7 |

As evident from the above Tables, the glass plates in Examples of the present invention have an average internal transmittance T$_{Ave}$ in the visible region of at least 80% and a chromaticity Y of tristimulus values in the XYZ colorimetric system as defined in JIS Z8701 (Appendix) of at least 90%, under the effective optical path length. Further, the glass plates in Examples of the present invention satisfy the relations of 125 (cm·ppm)≤L×A≤10000 (cm·ppm) and 2.5 (cm·ppm)≤L×B≤3000 (cm·ppm).

Whereas the glass plates in Comparative Examples have an average internal transmittance T$_{Ave}$ in the visible region of less than 80% and a chromaticity Y of tristimulus values in the XYZ colorimetric system as defined in JIS Z8701 (Appendix) of less than 90%, under the effective optical path length. Further, all the glass plates in Comparative Examples have the relation of L×A>10000 (cm·ppm). Further, in Comparative Example 3, L×B>3000 (cm·ppm).

INDUSTRIAL APPLICABILITY

The glass plate of the present invention, which has an average internal transmittance in the visible region of at least 80% and a chromaticity Y of at least 90%, is suitable as a light guide plate to cope with an increase in the size of the screen of a liquid crystal display device. Further, the glass plate of the present invention, which is made of glass, has favorable heat resistance when used as a light guide plate. Such a glass plate is useful as a light guide plate for a light guide plate unit, such a light guide plate unit is useful for a planar light-emitting device, and such a planar light-emitting device is useful for a liquid crystal display device.

This application is a continuation of PCT Application No. PCT/JP2014/079369 filed on Nov. 5, 2014, which is based upon and claims the benefit of priority from Japanese Patent Application No. 2013-232008 filed on Nov. 8, 2013. The contents of those applications are incorporated herein by reference in their entireties.

REFERENCE SYMBOLS

10: light guide plate unit
20: light guide plate
30: reflecting plate
40: light-scattering part (dot pattern)

What is claimed is:

1. A glass plate, consisting of multicomponent oxide glass, having an effective optical path length of from 25 to 200 cm, a thickness of from 0.5 to 10 mm, a total iron content in the glass plate as calculated as Fe$_2$O$_3$ of from 5 to 50 ppm and an average internal transmittance in the visible region of at least 80% and a chromaticity Y of tristimulus values in the XYZ colorimetric system as defined in JIS Z8701 (Appendix) of at least 90%, under the effective optical path length, and satisfying the relation of 2.5 (cm·ppm)<L×B<3,000 (cm·ppm), where L (cm) is the effective optical path length of the glass plate, and B (mass ppm) is the content of Fe$^{2+}$ in total iron as calculated as Fe$_2$O$_3$ of the glass plate,
wherein the effective optical path length is a distance from an edge surface from which light enters the glass plate to an edge surface on the opposite side.

2. A glass plate, consisting of multicomponent oxide glass, having an effective optical path length of from 25 to 200 cm, a thickness of from 0.5 to 10 mm, a total iron content in the glass plate as calculated as Fe$_2$O$_3$ of from 5 to 50 ppm, and an average internal transmittance in the visible region of at least 80% and a chromaticity Y of tristimulus values in the XYZ colorimetric system as defined in JIS Z8701 (Appendix) of at least 90%, under the effective optical path length, and satisfying the relation of 2.5 (cm·ppm)<L×B<2,400 (cm·ppm), where L (cm) is the effective optical path length of the glass plate, and B (mass ppm) is the content of Fe$^{2+}$ in total iron as calculated as Fe$_2$O$_3$ of the glass plate,
wherein the effective optical path length is a distance from an edge surface from which light enters the glass plate to an edge surface on the opposite side.

3. A glass plate, consisting of multicomponent oxide glass, having an effective optical path length of from 25 to 200 cm, a thickness of from 0.5 to 10 mm, a total iron content in the glass plate as calculated as Fe$_2$O$_3$ of from 5 to 50 ppm, and an average internal transmittance in the visible region of at least 80% and a chromaticity Y of tristimulus values in the XYZ colorimetric system as defined in JIS Z8701 (Appendix) of at least 90%, under the effective optical path length, and satisfying the relation of 2.5 (cm·ppm)<L×B<1,850 (cm·ppm), where L (cm) is the effective optical path length of the glass plate, and B (mass ppm) is the content of $Fe^{2+}$ in total iron as calculated as $Fe_2O_3$ of the glass plate,
wherein the effective optical path length is a distance from an edge surface from which light enters the glass plate to an edge surface on the opposite side.

4. The glass plate according to claim 1, wherein if at least one component selected from the group consisting of $MnO_2$, $TiO_2$, NiO, CoO, $V_2O_5$, CuO and $Cr_2O_3$ is contained, the total content of such components is at most 0.1% (at most 1,000 ppm) as represented by mass percentage based on oxides.

5. The glass plate according to claim 2, wherein if at least one component selected from the group consisting of $MnO_2$, $TiO_2$, NiO, CoO, $V_2O_5$, CuO and $Cr_2O_3$ is contained, the total content of such components is at most 0.1% (at most 1,000 ppm) as represented by mass percentage based on oxides.

6. The glass plate according to claim 3, wherein if at least one component selected from the group consisting of $MnO_2$, $TiO_2$, NiO, CoO, $V_2O_5$, CuO and $Cr_2O_3$ is contained, the total content of such components is at most 0.1% (at most 1,000 ppm) as represented by mass percentage based on oxides.

7. The glass plate according to claim 1, wherein if at least one component selected from the group consisting of $CeO_2$, $Sb_2O_3$, $SnO_2$ and $As_2O_3$ is contained, the total content of such components is at most 0.3% (at most 3,000 ppm) as represented by mass percentage based on oxides.

8. The glass plate according to claim 2, wherein if at least one component selected from the group consisting of $CeO_2$, $Sb_2O_3$, $SnO_2$ and $As_2O_3$ is contained, the total content of such components is at most 0.3% (at most 3,000 ppm) as represented by mass percentage based on oxides.

9. The glass plate according to claim 3, wherein if at least one component selected from the group consisting of $CeO_2$, $Sb_2O_3$, $SnO_2$ and $As_2O_3$ is contained, the total content of such components is at most 0.3% (at most 3,000 ppm) as represented by mass percentage based on oxides.

10. The glass plate according to claim 1, wherein if at least one component selected from the group consisting of $MnO_2$, $TiO_2$, NiO, CoO, $V_2O_5$, CuO and $Cr_2O_3$ is contained, the total content of such components is at most 0.05% (at most 500 ppm) as represented by mass percentage based on oxides.

11. The glass plate according to claim 2, wherein if at least one component selected from the group consisting of $MnO_2$, $TiO_2$, NiO, CoO, $V_2O_5$, CuO and $Cr_2O_3$ is contained, the total content of such components is at most 0.05% (at most 500 ppm) as represented by mass percentage based on oxides.

12. The glass plate according to claim 3, wherein if at least one component selected from the group consisting of $MnO_2$, $TiO_2$, NiO, CoO, $V_2O_5$, CuO and $Cr_2O_3$ is contained, the total content of such components is at most 0.05% (at most 500 ppm) as represented by mass percentage based on oxides.

13. The glass plate according to claim 1, wherein if at least one component selected from the group consisting of $CeO_2$, $Sb_2O_3$, $SnO_2$ and $As_2O_3$ is contained, the total content of such components is at most 0.2% (at most 2,000 ppm) as represented by mass percentage based on oxides.

14. The glass plate according to claim 2, wherein if at least one component selected from the group consisting of $CeO_2$, $Sb_2O_3$, $SnO_2$ and $As_2O_3$ is contained, the total content of such components is at most 0.2% (at most 2,000 ppm) as represented by mass percentage based on oxides.

15. The glass plate according to claim 3, wherein if at least one component selected from the group consisting of $CeO_2$, $Sb_2O_3$, $SnO_2$ and $As_2O_3$ is contained, the total content of such components is at most 0.2% (at most 2,000 ppm) as represented by mass percentage based on oxides.

16. The glass plate according to claim 1, wherein the composition, except for iron, substantially comprises, as represented by mass percentage based on oxides, from 60 to 80% of $SiO_2$, from 0 to 7% of $Al_2O_3$, from 0 to 10% of MgO, from 4 to 20% of CaO, from 7 to 20% of $Na_2O$ and from 0 to 10% of $K_2O$.

17. The glass plate according to claim 2, wherein the composition, except for iron, substantially comprises, as represented by mass percentage based on oxides, from 60 to 80% of $SiO_2$, from 0 to 7% of $Al_2O_3$, from 0 to 10% of MgO, from 4 to 20% of CaO, from 7 to 20% of $Na_2O$ and from 0 to 10% of $K_2O$.

18. The glass plate according to claim 3, wherein the composition, except for iron, substantially comprises, as represented by mass percentage based on oxides, from 60 to 80% of $SiO_2$, from 0 to 7% of $Al_2O_3$, from 0 to 10% of MgO, from 4 to 20% of CaO, from 7 to 20% of $Na_2O$ and from 0 to 10% of $K_2O$.

19. The glass plate according to claim 1, wherein the composition except for iron substantially comprises, as represented by mass percentage based on oxides, from 45 to 80% of $SiO_2$, more than 7% and at most 30% of $Al_2O_3$, from 0 to 15% of $B_2O_3$, from 0 to 15% of MgO, from 0 to 6% of CaO, from 7 to 20% of $Na_2O$, from 0 to 10% of $K_2O$ and from 0 to 10% of $ZrO_2$.

20. The glass plate according to claim 2, wherein the composition except for iron substantially comprises, as represented by mass percentage based on oxides, from 45 to 80% of $SiO_2$, more than 7% and at most 30% of $Al_2O_3$, from 0 to 15% of $B_2O_3$, from 0 to 15% of MgO, from 0 to 6% of CaO, from 7 to 20% of $Na_2O$, from 0 to 10% of $K_2O$ and from 0 to 10% of $ZrO_2$.

21. The glass plate according to claim 3, wherein the composition except for iron substantially comprises, as represented by mass percentage based on oxides, from 45 to 80% of $SiO_2$, more than 7% and at most 30% of $Al_2O_3$, from 0 to 15% of $B_2O_3$, from 0 to 15% of MgO, from 0 to 6% of CaO, from 7 to 20% of $Na_2O$, from 0 to 10% of $K_2O$ and from 0 to 10% of $ZrO_2$.

22. The glass plate according to claim 1, wherein the composition except for iron substantially comprises, as represented by mass percentage based on oxides, from 45 to 70% of $SiO_2$, from 10 to 30% of $Al_2O_3$, from 0 to 15% of $B_2O_3$, from 5 to 30% in total of at least one component selected from the group consisting of MgO, CaO, SrO and BaO, and at least 0% and less than 7% in total of at least one component selected from the group consisting of $Li_2O$, $Na_2O$ and $K_2O$.

23. The glass plate according to claim 2, wherein the composition except for iron substantially comprises, as represented by mass percentage based on oxides, from 45 to 70% of $SiO_2$, from 10 to 30% of $Al_2O_3$, from 0 to 15% of $B_2O_3$, from 5 to 30% in total of at least one component selected from the group consisting of MgO, CaO, SrO and BaO, and at least 0% and less than 7% in total of at least one component selected from the group consisting of $Li_2O$, $Na_2O$ and $K_2O$.

24. The glass plate according to claim 3, wherein the composition except for iron substantially comprises, as represented by mass percentage based on oxides, from 45 to 70% of $SiO_2$, from 10 to 30% of $Al_2O_3$, from 0 to 15% of $B_2O_3$, from 5 to 30% in total of at least one component selected from the group consisting of MgO, CaO, SrO and BaO, and at least 0% and less than 7% in total of at least one component selected from the group consisting of $Li_2O$, $Na_2O$ and $K_2O$.

25. The glass plate according to claim 22, which has a content of $Fe^{2+}$ in total iron as calculated as $Fe_2O_3$ of from 0.02 to 30 ppm.

26. The glass plate according to claim 23, which has a content of $Fe^{2+}$ in total iron as calculated as $Fe_2O_3$ of from 0.02 to 30 ppm.

27. The glass plate according to claim 24, which has a content of $Fe^{2+}$ in total iron as calculated as $Fe_2O_3$ of from 0.02 to 30 ppm.

28. A light guide plate unit, comprising a light guide plate, a dot pattern as a light scattering part on a light-reflecting surface on the opposite side of the light guide plate from a light-emitting surface, and a reflecting plate arranged on the light-reflecting surface side of the light guide plate, wherein the light guide plate is the glass plate according to claim 1.

29. A light guide plate unit, comprising a light guide plate, a dot pattern as a light scattering part on a light-reflecting surface on the opposite side of the light guide plate from a light-emitting surface, and a reflecting plate arranged on the light-reflecting surface side of the light guide plate, wherein the light guide plate is the glass plate according to claim 2.

30. A light guide plate unit, comprising a light guide plate, a dot pattern as a light scattering part on a light-reflecting surface on the opposite side of the light guide plate from a light-emitting surface, and a reflecting plate arranged on the light-reflecting surface side of the light guide plate, wherein the light guide plate is the glass plate according to claim 3.

31. A planar light-emitting device, comprising the light guide plate unit according to claim 28, and a light source disposed on a side surface of the light guide plate in the light guide plate unit.

32. A planar light-emitting device, comprising the light guide plate unit according to claim 29, and a light source disposed on a side surface of the light guide plate in the light guide plate unit.

33. A planar light-emitting device, comprising the light guide plate unit according to claim 30, and a light source disposed on a side surface of the light guide plate in the light guide plate unit.

34. A liquid crystal display device, comprising the planar light-emitting device according to claim 31, and a liquid crystal unit disposed on the light-emitting surface side of the planar light-emitting device.

35. A liquid crystal display device, comprising the planar light-emitting device according to claim 32, and a liquid crystal unit disposed on the light-emitting surface side of the planar light-emitting device.

36. A liquid crystal display device, comprising the planar light-emitting device according to claim 33, and a liquid crystal unit disposed on the light-emitting surface side of the planar light-emitting device.

37. The glass plate according to claim 1, wherein the total iron content in the glass plate as calculated as $Fe_2O_3$ is from 5 to 20 ppm.

* * * * *